R. F. LAWSON.
OILING DEVICE FOR DOUGH MOLDING MACHINES.
APPLICATION FILED JAN. 10, 1919.

1,305,127.

Patented May 27, 1919.
2 SHEETS—SHEET 1.

WITNESS:
R. E. Hamilton

INVENTOR.
Reuben F. Lawson,
BY Chas. W. Gerard
ATTORNEY

R. F. LAWSON.
OILING DEVICE FOR DOUGH MOLDING MACHINES.
APPLICATION FILED JAN. 10, 1919.
1,305,127.
Patented May 27, 1919.
2 SHEETS—SHEET 2.
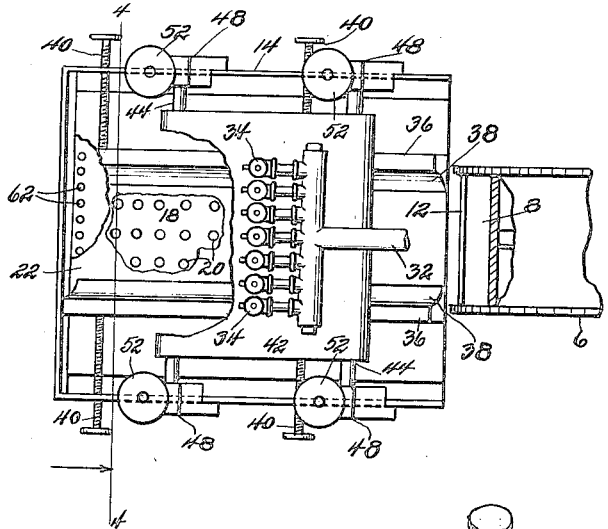
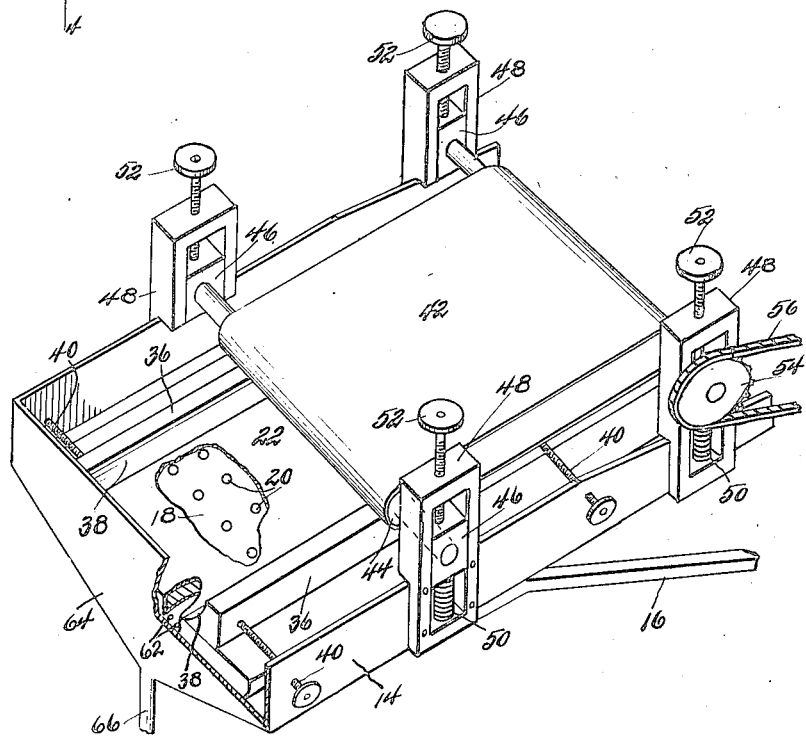
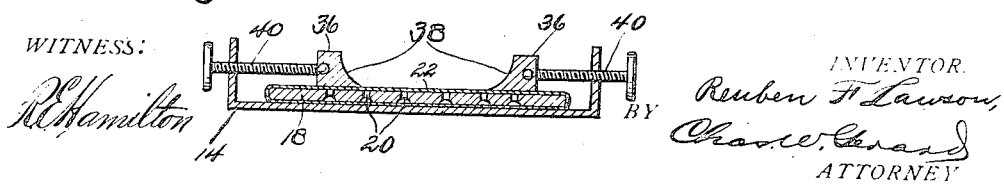
WITNESS:
R. L. Hamilton
INVENTOR.
Reuben F. Lawson,
BY Chas. W. Gerard
ATTORNEY

UNITED STATES PATENT OFFICE.

REUBEN F. LAWSON, OF KANSAS CITY, MISSOURI.

OILING DEVICE FOR DOUGH-MOLDING MACHINES.

1,305,127.  Specification of Letters Patent.  Patented May 27, 1919.

Application filed January 10, 1919. Serial No. 270,580.

*To all whom it may concern:*

Be it known that I, REUBEN F. LAWSON, a citizen of the United States, residing at Kansas City, in the county of Jackson, State of Missouri, have invented certain new and useful Improvements in Oiling Devices for Dough-Molding Machines, of which the following is a full and exact specification.

The present invention relates to baking appliances, and more particularly to dough-molding or loaf-forming machines, such as form a part of the equipment of bread manufacturing plants, and one of the objects in view is to provide a novel form of mechanism for treating the loaves, as discharged from such machines, with a coating of grease or butter oil before the loaves are placed in the baking pans.

To this end I have devised a mechanism adapted to be associated with the discharge or loaf delivery point of the dough-molding machine, and comprising an oil treated surface in position to receive the loaves as discharged from the machine, and impart to the loaves the proper amount or coating of oil as the loaves traverse the surface to the point where they are removed for placing in the pans.

It is also an object to provide a mechanism of the character described which is adapted not only to apply the proper coating of oil to the sides of the loaves, but also to impart the same oil treatment to the ends of the loaves by the operation of said mechanism.

In carrying out the invention I provide an apparatus which comprises an oil prepared surface, together with automatic conveyer mechanism adapted to engage the loaves and cause the same to traverse the oil treated surface at a uniform rate and under uniform pressure. The invention further comprises suitably regulated means for maintaining the proper degree of oil treatment on the oil-imparting surface.

It is also sought to devise an apparatus of this type which will be both simple and efficient in its operation, as well as adapted to be easily installed in connection with molding machines of the usual construction.

With these general objects in view the invention will now be described with reference to the accompanying drawings illustrating one form of construction which has been devised for embodying the proposed improvements, after which the novel features therein will be set forth and defined in the appended claims.

In the drawings—

Fig. 2 is a plan view of the parts comprising the said oil-applying mechanism;

Fig. 3 is a perspective view of the same, on a larger scale; and

Fig. 4 is a transverse section taken on the line 4—4 of Fig. 2.

Figure 1:
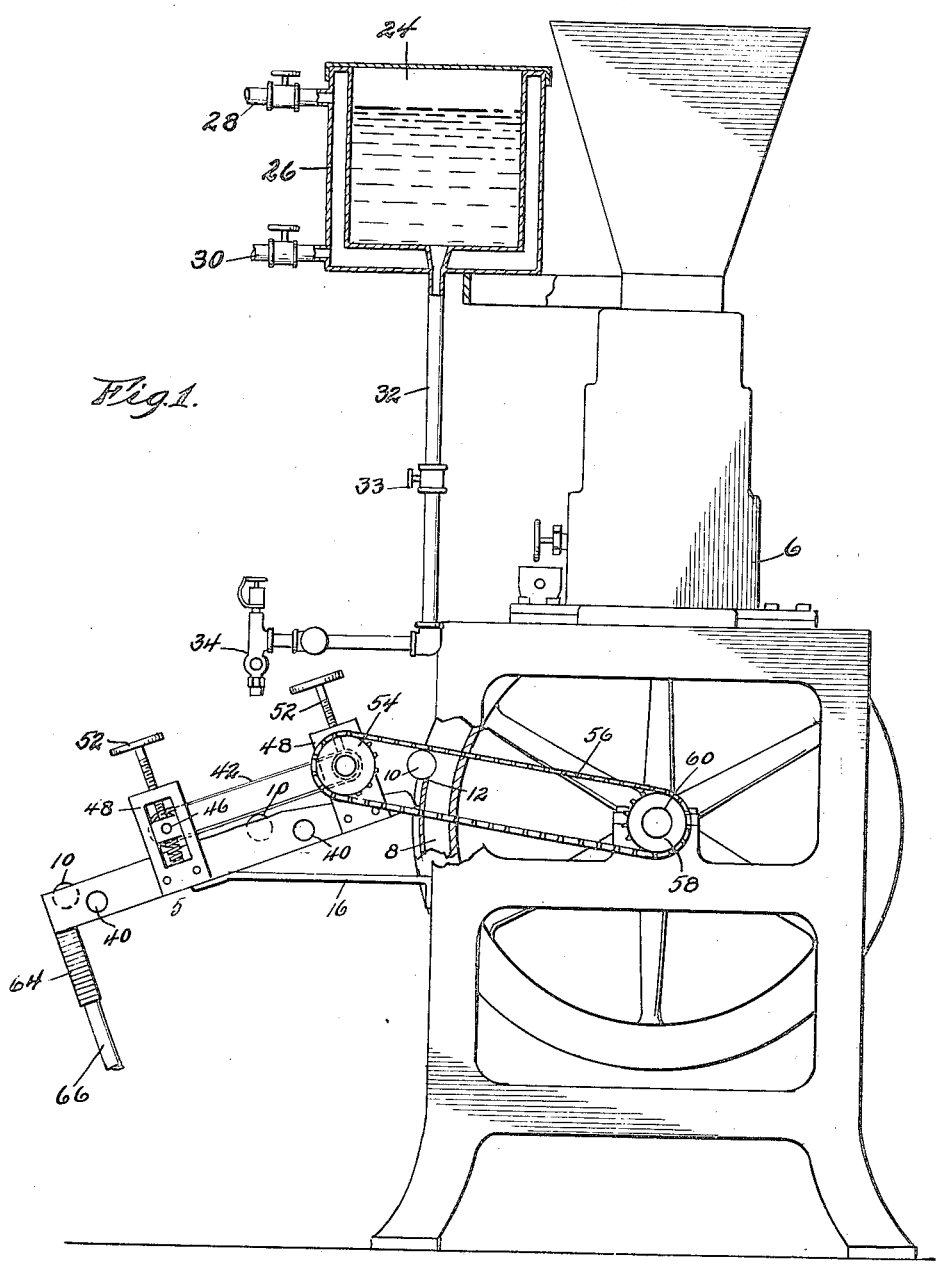
Figure 1 is a side elevation, partly broken away and in section, showing a dough-molding machine equipped with oil-applying mechanism embodying the present features of improvement.

Referring to the drawings in detail, these illustrate a dough-molding or loaf-forming machine 6 of the usual commercial form, as used in the manufacture of bread, from the mold passage 8 of which machine the loaves 10 are discharged by way of the outlet 12. At this point, for receiving the molded loaves as they are discharged from the machine, I provide the present improved loaf oiling mechanism, which comprises a trough 14 supported in inclined position by arms 16 from the framework of the machine 6, with the rear end of said trough directly underlying the discharge outlet 12. Within this trough 14 is carried a tray 18 having a series of perforations 20 distributed over the greater portion of its area, the lower end portion of said tray, however, being left plain. Over the tray 18 is spread a suitable oil-distributing cloth 22. For feeding a supply of oil to the cloth 22, I provide a tank or reservoir 24 inclosed by a steam jacket 26 fitted with the steam pipes 28, 30, and also with a feed pipe 32 having the valve 33 and leading to a series of valve-controlled sight feed cups 34 of any suitable type arranged transversely of the trough 14. By this means the amount of oil allowed to drip upon the mechanism may be conveniently and accurately controlled, it being understood that by the term "oil" I refer to those greases or fats commonly used in the baking process for greasing the pans and the like, these greases and fats being maintained in a liquid state by the action of the steam in the jacket 26.

Obviously, with the cloth 22 thus treated with the oil from the cups 34 and forming an oil-imparting surface, the loaves 10 on being discharged from the molding machine will gravitate along this inclined surface and, by contact with the cloth, take up a portion of the oil therefrom. The main portion or sides of the loaves are in this way effectively treated, and in addition to this I also provide means for applying a similar treatment to the ends of the loaves. For this purpose a pair of side members 36 are placed at opposite sides of the trough 14, said members resting upon the cloth 22 and being formed with concave inner faces 38 constituting, in effect, curved continuations of the oil-imparting surface of the cloth, and thus adapting said members to treat the rounded ends of the loaves as they traverse the space between said members. These side members are also adjustable to conform to the approximate length of the loaves, screws 40 being provided for this adjustment, said screws being mounted in the sides of the trough 14 and having a swivel connection with the members 36, as shown in Fig. 4. For maintaining a supply of oil on the curved faces 38, the outer feed cups 34 are positioned over the two side members 36.

While in view of the inclined position of the trough 14, as illustrated in the drawings, no other means is absolutely essential for producing the required movement of the loaves over the oil-imparting surface, under certain conditions, such as for different angles of trough, or where it may be desired to produce a perfectly uniform travel of the loaves and under a uniform pressure upon the oil surface, it may prove advisable to provide additional means for accomplishing this result. For this purpose I illustrate an endless belt 42 carried by rollers 44 journaled in takeup bearings 46 mounted in guides 48 at the sides of the trough 14. Springs 50 in the guides 48 serve to support the bearings 46, which latter are fitted with takeup screws 52 for adjusting the same. One of the rollers 44 is provided with a sprocket wheel 54 which is driven by a chain 56 from a sprocket wheel 58 on the drive shaft 60 of the machine 6. By means of this construction the belt 42 is continuously driven at a uniform speed and operates to engage the loaves 10 and roll the same at a uniform rate and under a uniform contacting pressure upon the oil-imparting surface. In this arrangement of course the oil is received first upon the belt 42 and is indirectly fed to the cloth 22 by contact of the cloth with the loaves in the oil-applying process.

Any surplus oil is carried off through the perforations 20 and openings 62 which are provided in the lower end of the trough 14, and thence by way of the tapered collecting chamber 64 and pipe 66 to any suitable receptacle (not shown). The surplus oil is thus principally drained away before reaching the plain or unperforated lower end of the tray 18, so that the cloth overlying the lower end of the tray, where the loaves come to rest, is not unduly wet with the oil, and hence the momentary stop of the loaves at this point, before they are removed, will not result in their collecting an unnecessary quantity of the oil.

It will thus be apparent that I have provided an efficient and comparatively simple arrangement and construction for carrying out the desired objects of the invention, the operation of which will be obvious from the foregoing, without going into the same in further detail,—the essential feature of said operation being the imparting of the required amount of oil to the molded dough by rolling contact thereof with an oil-treated surface, as the molded dough is discharged from the molding machine. Obviously, one of the important economies which is thus achieved is the elimination of the laborious process of greasing the pans; and in addition to the saving of this labor, there is a great sanitary gain, because in the greasing of pans it is practically impossible to avoid getting the pans greasy more or less on the outside as well as on the inside, and thus the pans are put in capital condition for collecting foreign substances which readily adhere to the pans, and the workmen in handling the pans are likewise smeared with the grease and find it difficult to keep clean. Under such circumstances, of course, the workman naturally can not handle pans which are soiled on the outside and at the same time keep the inside of the pans perfectly clean. Again, where the pans are greased, it is not possible always to grease them perfectly uniformly, and more or less oil is wasted in uneven greasing as well as in the applying of the grease to more pan surface than is actually necessary. In the present operation, practically ideal conditions are attained as regards uniformity of the oiling process, and a great saving is made in the oil, since no portion of the pan's surface is ever greased except such portions as come in contact with the loaf. Thus, the present invention saves all labor in the pan greasing department, saves in the quantity of oil or grease used, and accomplishes a substantial sanitary gain in the matter of keeping the pans and the workmen clean, since no excess grease is used and none of it is ever applied except to the loaves and thereby to the interior only of the pans. Another point of advantage is in the saving of flour, more or less of which has always been used heretofore for sprinkling the loaves as they are discharged from the molding machine.

It is also to be observed that in the carrying out of the present improved oiling process, the whole loaf is greased or oiled, in contrast to only a part of the loaf being so treated when the pan is greased rather than the loaf. A distinct and important benefit is gained by virtue of this complete oiling of the outside of the loaf, because it prevents the formation of a tough, inelastic crust on the top of the unbaked loaf, such as always forms on a loaf when its top surface is not so treated and the loaf is allowed to stand for a few moments prior to its being steamed. This crust is objectionable because it interferes with the proper rising or "springing" of the loaf. Where the top of the loaf is oiled, however, as well as the ends and sides, no such crust is allowed to form, and any slight delay which is always likely to occur *en route* to the steam box is of no consequence. Attempts have been made to apply the necessary oil coating during the molding operation, but this has been found to be objectionable because more or less of the oil is worked or kneaded into the dough, thereby producing an inferior product when baked.

It may also be pointed out that the oiling of the top of the loaf results in a better color being imparted to the loaf, on its being baked, and less sugar is required to be used in the dough with the present process for acquiring this desired color. By the novel dripping means shown for applying the oil, it is also possible to produce a blended crust flavor by mixing the oil and fat ingredients which are placed in the receptacle 24, in any desired proportions for this purpose.

While the foregoing illustrates what is now regarded as constituting the preferred form of construction for embodying the proposed improvements, I desire to expressly reserve the right to make all such formal changes or modifications as may fairly fall within the scope of the appended claims.

Having described the invention, what I claim as new and desire to secure by Letters Patent is:

1. In baking apparatus, the combination with the dough-molding machine, of an oil-imparting surface associated with the discharge outlet of said machine in position to receive the molded dough and impart oil thereto as it traverses said surface.

2. In baking apparatus, the combination with the dough-molding machine, of an oil-imparting surface associated with the discharge outlet of said machine in a downwardly-inclined position with reference to said outlet for allowing the molded dough to gravitate across said surface and thereby imparting oil thereto as it traverses said surface.

3. In baking apparatus, the combination with the loaf-forming machine, of an oil-imparting surface associated with the discharge outlet of said machine in position to receive the loaves as discharged from the machine, said surface being formed to impart oil to the sides and ends of the loaves as they traverse said surface.

4. In baking apparatus, the combination with the loaf-forming machine, of an oil imparting surface associated with the discharge outlet of said machine in position to receive the loaves as discharged from the machine and impart oil to the sides of said loaves as they traverse said surface, and adjustable side members provided with curved oil-treated surfaces forming continuations of said first surface for oiling the ends of the loaves as they pass between said members.

5. In baking apparatus, the combination with the dough-molding machine, of an oil-imparting surface associated with the discharge outlet of said machine in position to receive the molded dough and impart oil thereto as it traverses said surface, and means for engaging the molded dough as discharged from the machine and causing the same to traverse said surface.

6. In baking apparatus, the combination with the dough-molding machine, of an oil-imparting surface associated with the discharge outlet of said machine in position to receive the molded dough and impart oil thereto as it traverses said surface, and an endless continuously-driven belt overlying said surface in position to engage the molded dough as discharged from the machine and cause the same to traverse said surface.

7. In baking apparatus, the combination with the dough-molding machine, of a receiving surface associated with the discharge outlet of said machine in position to receive the molded dough as discharged from the machine, an endless continuously-driven belt overlying said surface in position to engage the molded dough as discharged from the machine and cause the same to traverse said surface, and means for feeding oil to said belt.

In witness whereof I affix my signature.

REUBEN F. LAWSON.